(12) United States Patent
Woods

(10) Patent No.: US 6,467,752 B2
(45) Date of Patent: Oct. 22, 2002

(54) UNITARY FITTING AND BALL-VALVE

(75) Inventor: Terrance J. Woods, Hamilton (CA)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/768,632

(22) Filed: Jan. 23, 2001

(65) Prior Publication Data

US 2001/0020691 A1 Sep. 13, 2001

Related U.S. Application Data

(63) Continuation-in-part of application No. 09/359,826, filed on Jul. 23, 1999.

(51) Int. Cl.[7] .............................. F16K 5/06; F16L 19/08
(52) U.S. Cl. .................................... 251/148; 285/382.7
(58) Field of Search ................................. 251/148, 151; 285/382.7

(56) References Cited

U.S. PATENT DOCUMENTS

| | | | | |
|---|---|---|---|---|
| 2,695,796 A | * | 11/1954 | Woodling ............ | 285/382.7 X |
| 3,402,948 A | * | 9/1968 | Kreidel, Sr. et al. .. | 285/382.7 X |
| 4,309,050 A | * | 1/1982 | Legris ................. | 285/382.7 X |
| 4,867,489 A | * | 9/1989 | Patel .................... | 285/382.7 X |
| 4,985,975 A | * | 1/1991 | Austin et al. ............ | 285/382.7 |
| 5,586,749 A | * | 12/1996 | Conley et al. .............. | 251/148 |
| 5,595,368 A | * | 1/1997 | Bogdany et al. ........ | 251/148 X |
| 6,131,964 A | * | 10/2000 | Sareshwala .......... | 285/382.7 X |

* cited by examiner

Primary Examiner—Henry C. Yuen
Assistant Examiner—Eric Keasel
(74) Attorney, Agent, or Firm—James Ray & Associates

(57) ABSTRACT

The present invention provides in combination with a ball-valve, an improvement comprising a threadless metallic fitting that incorporates both a male portion and a female portion formed as an integral unitary structure extending from at least one end wall of a housing portion of the ball-valve. The threadless metallic fitting includes a sleeve portion having a female interior surface adapted for receiving one of a tube and a pipe section therein and a male exterior surface having at least two distinct cylindrical sections. There is also a driver member having at least two distinct cylindrical sections for engaging the male exterior surface of the sleeve portion for deforming the sleeve portion and concurrently deforming such one of such tube and pipe section engaged within the sleeve portion when the driver member is forced longitudinally along the male exterior surface of the sleeve portion so as to effect an air tight seal between the pipe section and the female interior surface of the fitting.

13 Claims, 1 Drawing Sheet

UNITARY FITTING AND BALL-VALVE

CROSS-REFERENCE TO RELATED APPLICATIONS

This is a continuation-in-part, of application Ser. No. 09/359,826, filed Jul. 23, 1999.

FIELD OF THE INVENTION

The invention relates to ball-valves or ballcocks integrally provided with threadless metallic fittings and, more particularly, the present invention relates to a threadless fitting that incorporates both a male portion and a female portion formed as an integral unitary structure.

BACKGROUND OF THE INVENTION

Ball-valves are used in a variety of piping, tubing and conduit systems that handle gases and liquids. A typical ball-valve includes a center ball provided with a through-passage or passageway. In a manually operated valve, a handle is connected to the ball to rotate the ball and the though-passageway in a manner that either aligns the passageway with opposed ports in the valve housing or positions the passageway crosswise of the ports.

Pipes have historically been connected to the ball valves by welding. However, welding pipe to valve bodies is undesirable for several reasons. For example, in welding pipe to the body of a ballcock, the ballcock has to be disassembled and seals removed from the ballcock so that the heat of the welding process does not damage the seals. Another problem that can be encountered with such welding is the case where the ballcock and piping is located near walls or other structures and where the limited space makes it difficult to provide a complete welding pass around the circumference of the pipe and ballcock.

SUMMARY OF THE INVENTION

The present invention provides in combination with a ball-valve, an improvement comprising a threadless metallic fitting that incorporates both a male portion and a female portion formed as an integral unitary structure extending from at least one end wall of a housing portion of the ball-valve. The threadless metallic fitting includes a sleeve portion having a female interior surface adapted for receiving one of a tube and a pipe section therein and a male exterior surface having at least two distinct cylindrical sections. There is also a driver member having at least two distinct cylindrical sections for engaging the male exterior surface of the sleeve portion for deforming the sleeve portion and concurrently deforming such one of such tube and pipe section engaged within the sleeve portion when the driver member is forced longitudinally along the male exterior surface of the sleeve portion so as to effect an air tight seal between the pipe section and the female interior surface of the fitting.

OBJECTS OF THE INVENTION

It is, therefore, one of the primary objects of the present invention to provide a ball valve with threadless fittings for connections with tubes or pipes.

Another object of the present invention is to provide a ball valve with connections that do not require welding.

Yet another object of the present invention is to provide an airtight seal between the pipe and section and the interior of the threadless fitting.

In addition to the numerous objects and advantages of the present invention which have been described with some degree of particularity above, it should be both noted and understood that a number of other important objects and advantages of the ball vlve with a threadless fitting will become more readily apparent to those persons who are skilled in the relevant art from the following more detailed description of the invention, particularly, when such detailed description is taken in conjunction with the appended claims.

Figure 1:
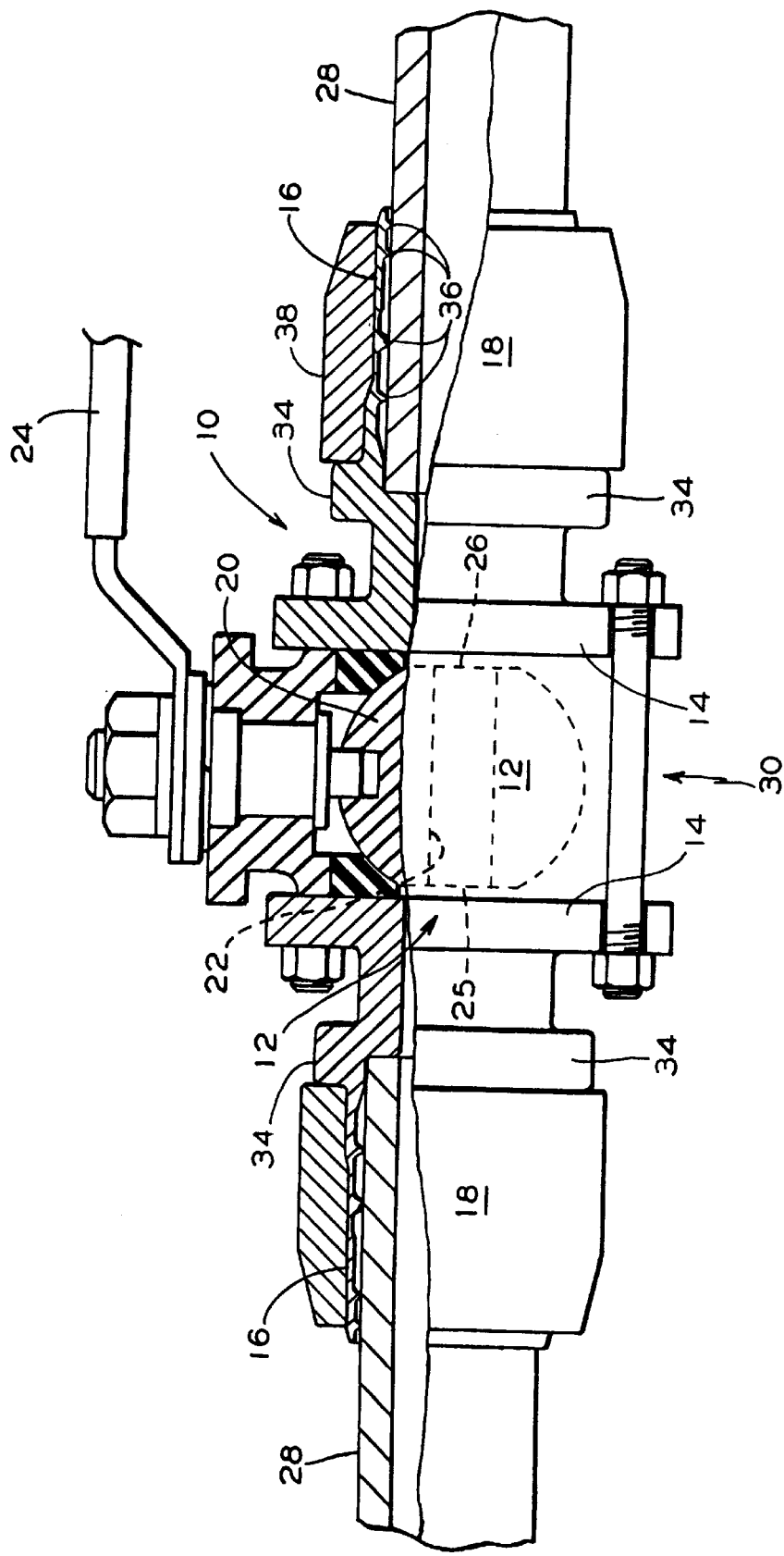
FIG. 1 is a partial side elevation and longitudinal section of a one-piece ball-valve and threadless fitting combination.

BRIEF DESCRIPTION OF THE PRESENTLY PREFERRED AND VARIOUS ALTERNATE EMBODIMENTS OF THE PRESENT INVENTION

Referring now to the drawing FIGURE, an integral ballcock or ball-valve fitting combination, generally designated 10, is shown that includes the housing body 12 of a ballcock valve, generally designated 30. The housing body 12 includes end walls 14 with both walls 14 shown integrally formed with the threadless fitting 18. It should be understood that the valve can be provided with only one such integral fitting. The housings of ballcocks are usually provided with at least one end wall 14 that is separable from the housing proper for assembly and disassembly of internal components of the ballcock.

The housing 12 of a ballcock or ball-valve 30 contains a ball 20 (only partially visible in the FIGURE) provided with a through-passage or bore 22 (shown in dash outline). The ball 20 can be manually operated in the housing 12 by a handle 24 mechanically connected to the ball 20. Alternatively, the ball-valve can be operated electrically. When the ball 20 is rotated to align passageway 22 with opposed ports 25 and 26 of the valve, the valve is in an "open" position to allow passage of a fluid or a fluid pressure therethrough. When the ball 20 is rotated to a position that locates passageway 22 generally cross-wise of the ports, the valve is closed.

As explained further above, ballcock valves are used extensively in industry, including the railroad industry, to control the flow of numerous fluids and fluid pressures. It is, therefore, often necessary to connect such ball-valves to piping used in industry. Heretofore, such ball-valves are connected to piping by cooperating threads, by welding either socket or butt, or by bolting flange to flange (using a flange typically welded to the pipe end).

The present invention provides a ball valve 30 with a threadless fitting 18 to connect pipes or tubing 28 together in an air-tight manner without any need of welding. The threadless fitting 18 incorporates a combination female interior portion and male exterior portion. A pipe or tube 28 is inserted into the female interior portion of the fitting 18. A driver member 38 is forced longitudinally over the male exterior surface of such fitting 18 by a hydraulic tool (not shown). The action of the driver member 38 causes the fitting 18 to deform and concurrently causing the pipe 28 to deform so that air tight seal between the female interior surface of the fitting 18 and the pipe 28 is effected.

After the threadless fitting 18 is compressed onto such pipe section 28, the pipe section 28 exerts an outwardly directed force at against the compressive force of the fitting 18. Together, these two forces provide a very effective seal without the need to thread or weld the pipe and threadless fitting together.

In the present invention such threadless fitting 18 includes a sleeve portion 16 and a stop flange 34. Sleeve portion 16 has an female interior surface having a plurality of projections 36 and an male exterior surface having at least two distinct cylindrical sections. The female interior surface of sleeve portion 16 is designed to receive a pipe or tube section 28. A pipe section 28 is inserted into such sleeve portion 16. When a swage ring or sleeve driver 38 is forced over the male exterior surface of sleeve portion 16 of threadless fitting 18 by a hydraulic tool (not shown) the sleeve portion 16 and concurrently the pipe section 28 are deformed. When swage ring or sleeve driver 38 is forced over the male exterior surface of sleeve portion 16, projections 36 on the female interior surface are pressed into pipe section 28 thereby securing pipe section 28 inside the threadless fitting 18. The driver 38 also has at least two distinct cylindrical surfaces that correspond to the cylindrical surfaces on the male exterior surface of sleeve portion 16. Sleeve driver 38 is forced over the male exterior surface of sleeve portion 16 until such sleeve driver 16 encounters stop flange 34, which prevents sleeve driver 38 from continuing any further lateral movement.

The materials of fitting 18 and valve 12 can be a 304, 316 or 4IGL stainless steel, ASTM A276 or A479 carbon steel, ASTM A675 or ASM AW6, or a copper nickel alloy.

It can be appreciated that with such an integral fitting, the ballcock and fitting combination may require no pipe welding, or pipe thread connections, and connectability of the ballcock to pipes, tubes and hoses is a substantial improvement over such welded and threaded connections.

While a presently preferred embodiment for carrying out the instant invention has been set forth in detail, those persons skilled in the art of pneumatic and hydraulic connections to which this invention pertains will recognize various alternative ways of practicing the invention without departing from the spirit and scope of the claims appended hereto.

I claim:

1. In combination with a ball-valve, the improvement comprising a threadless metallic fitting including an end wall portion formed as an integral unitary structure and serving as at least one end wall of a housing portion of said ball-valve, said threadless metallic fitting including;

(a) a sleeve portion integrally formed with said end wall portion of said threadless metallic fitting and extending outwardly therefrom, said sleeve portion having a female interior surface adapted for receiving one of a tube and a pipe section therein and a male exterior surface having at least two distinct cylindrical sections;

(b) a means engageable with said end wall portion of said threadless fitting for securing said end wall portion to said ball-valve housing; and (c) a driver member having at least two distinct cylindrical sections engaging said male exterior surface of said sleeve portion for deforming said sleeve portion and concurrently deforming such one of such tube and pipe section engaged within said sleeve portion when said driver member is forced longitudinally along said male exterior surface of said sleeve portion so as to effect an air tight seal between such one of such tube and pipe section and said female interior surface of said fitting.

2. A combination, according to claim 1, wherein said female interior surface of said sleeve portion further includes a plurality of tooth like projections extending radially inwardly for sealing such one of such pipe and tube within said sleeve portion.

3. A combination, according to claim 2, wherein said plurality of tooth like projections on said female interior surface of said sleeve portion includes at least one tooth like projection extending radially inwardly as an outboard seal, said at least one tooth like projection being disposed closely adjacent an end of said sleeve portion.

4. A combination, according to claim 2, wherein said plurality of tooth like projections includes four tooth like projections.

5. A combination, according to claim 4, wherein said at least one of said four tooth like projections is a double tooth like projection.

6. A combination, according to claim 5, wherein said sleeve portion has at least one section that is thinner in cross section than a remainder of said sleeve portion.

7. A combination, according to claim 6, wherein said at least 15 one section that is thinner in cross section is closely adjacent said double tooth like projection.

8. A combination, according to claim 1, wherein a portion of said sleeve portion of said female interior surface of said threadless fitting has an inner diameter that is substantially identical to an outer diameter of such one of such pipe and tube to which said threadless fitting will be joined.

9. A combination, according to claim 1, wherein said male exterior surface of said sleeve portion of said threadless fitting further includes a stop flange for restricting further lateral movement of said driver member.

10. A combination, according to claim 9, wherein said male exterior surface of said sleeve portion has at least one tapered section intermediate said stop flange and an end of said sleeve portion.

11. A combination, according to claim 1, wherein an interior surface said driver member has at least one tapered section.

12. A combination, according to claim 1, wherein said threadless fitting further includes an abutment portion that is substantially perpendicular to said female interior surface of said sleeve member for engaging an end of such one of such pipe and tuber section.

13. A combination, according to claim 1, wherein said male exterior surface of said sleeve portion of said threadless fitting has two tapered sections.

* * * * *

UNITED STATES PATENT AND TRADEMARK OFFICE
CERTIFICATE OF CORRECTION

PATENT NO.    : 6,467,752 B2
DATED         : October 22, 2002
INVENTOR(S)   : Terrance J. Woods It is certified that error appears in the above-identified patent and that said Letters Patent is hereby corrected as shown below:

<u>Column 4,</u>
Line 28, cancel the text beginning with "7. a combination" and ending with "tooth like projection."
Line 30, insert the following claim:
7. A combination, according to claim 6, wherein said at least one section that is thinner in cross section is closely adjacent said double tooth like projection Signed and Sealed this Seventeenth Day of August, 2004

JON W. DUDAS
*Acting Director of the United States Patent and Trademark Office*